US010444506B2

United States Patent
Evertt et al.

(10) Patent No.: US 10,444,506 B2
(45) Date of Patent: Oct. 15, 2019

(54) MIXED REALITY MEASUREMENT WITH PERIPHERAL TOOL

(71) Applicant: Microsoft Technology Licensing, LLC, Redmond, WA (US)

(72) Inventors: Jeffrey Jesus Evertt, Kirkland, WA (US); Karim Audrey Luccin, Redmond, WA (US); Jedd Chevrier, Redmond, WA (US); Matthew Jon Paul, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/595,857

(22) Filed: May 15, 2017

(65) Prior Publication Data

US 2018/0286127 A1 Oct. 4, 2018

Related U.S. Application Data

(60) Provisional application No. 62/481,047, filed on Apr. 3, 2017, provisional application No. 62/481,052, filed on Apr. 3, 2017.

(51) Int. Cl.
*G02B 27/00* (2006.01)
*G06T 19/00* (2011.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
CPC ................ G06T 19/006; G02B 27/0127
(Continued)

(56) References Cited

U.S. PATENT DOCUMENTS 9,123,171 B1 9/2015 Chavez et al.
2002/0158873 A1* 10/2002 Williamson ............ G06T 15/20
345/427

(Continued)

FOREIGN PATENT DOCUMENTS

WO 15176163 A1 11/2015
WO 2016112383 A1 7/2016
WO 2016130895 A1 8/2016

OTHER PUBLICATIONS

Bubnik, et al., "Light Chisel: 6DOF Pen Tracking", In Proceedings of 36th Annual Conference of the European Association for Computer Graphics, vol. 34, No. 4, May 4, 2015, 12 pages.
(Continued)

*Primary Examiner* — Hai Tao Sun
(74) *Attorney, Agent, or Firm* — Arent Fox LLP

(57) ABSTRACT

The techniques introduced here enable a display system, such as an HMD device, to generate and display to a user a holographic structure matching a real-world structure. In some embodiments vertices, edges and planes of the holographic schematics are generated via the use of a peripheral tool that is positioned by a user. In other embodiments, other user input indicates the bounds of the holographic schematic. In response to user action, a holographic schematic is made to appear including corresponding real-world size measurements. The corresponding measurements are used to develop a holographic structure that integrates with the holographic schematic.

21 Claims, 11 Drawing Sheets

(51) Int. Cl.
*G02B 27/01* (2006.01)
*G06T 11/20* (2006.01)
*G06F 3/0481* (2013.01)
*G06F 3/01* (2006.01)
*G06F 3/03* (2006.01)
*G06F 3/0484* (2013.01)
*G06F 3/16* (2006.01)
*G06T 7/70* (2017.01)
*G06T 7/60* (2017.01)

(52) U.S. Cl.
CPC .............. *G06F 3/011* (2013.01); *G06F 3/017* (2013.01); *G06F 3/0304* (2013.01); *G06F 3/04815* (2013.01); *G06F 3/04845* (2013.01); *G06T 11/206* (2013.01); *G02B 2027/014* (2013.01); *G02B 2027/0138* (2013.01); *G02B 2027/0187* (2013.01); *G06F 3/16* (2013.01); *G06T 7/60* (2013.01); *G06T 7/70* (2017.01); *G06T 2207/10028* (2013.01)

(58) Field of Classification Search
USPC ........................................................ 345/419
See application file for complete search history.

(56) References Cited

U.S. PATENT DOCUMENTS

| | | | | |
|---|---|---|---|---|
| 2012/0050281 | A1* | 3/2012 | Tanaka | ................. G06T 19/006 345/419 |
| 2012/0280988 | A1 | 11/2012 | Lampotang et al. | |
| 2013/0050070 | A1 | 2/2013 | Lewis et al. | |
| 2013/0262152 | A1* | 10/2013 | Collins | ............. G06F 17/30312 705/4 |
| 2013/0293530 | A1* | 11/2013 | Perez | ................. G06K 9/00671 345/418 |
| 2013/0323700 | A1 | 12/2013 | Samosky et al. | |
| 2014/0071165 | A1 | 3/2014 | Tuchschmid et al. | |
| 2014/0132733 | A1* | 5/2014 | Mundhenk | ............ G06T 3/4007 348/47 |
| 2015/0235367 | A1 | 8/2015 | Langer et al. | |
| 2015/0238276 | A1 | 8/2015 | Atarot et al. | |
| 2015/0356737 | A1 | 12/2015 | Ellsworth et al. | |
| 2016/0106508 | A1 | 4/2016 | Lathrop et al. | |
| 2016/0147408 | A1 | 5/2016 | Bevis et al. | |
| 2016/0148433 | A1 | 5/2016 | Petrovskaya et al. | |
| 2016/0163063 | A1 | 6/2016 | Ashman | |
| 2016/0242744 | A1 | 8/2016 | Mihailescu et al. | |
| 2017/0052507 | A1 | 2/2017 | Poulos et al. | |
| 2018/0173404 | A1* | 6/2018 | Smith | ................. G06F 3/04842 |

OTHER PUBLICATIONS

"Bridge", http://web.archive.org/web/20161212222829/https:/bridge.occipital.com/, Published on: Dec. 12, 2016, 14 pages.

Bae, et al., "Fast and Scalable Structure-From-Motion Based Localization for High-Precision Mobile Augmented Reality Systems", In Journal of Mobile User Experience, Jul. 19, 2016, 28 pages.

"International Search Report and Written Opinion Issued in PCT Application No. PCT/US2018/024693", dated Jun. 12, 2018, 12 Pages.

* cited by examiner

MIXED REALITY MEASUREMENT WITH PERIPHERAL TOOL

This application claims the benefit of U.S. Provisional Patent Application No. 62/481,047 filed on Apr. 3, 2017, titled "Mixed Reality Measurement With Peripheral Device", and U.S. Provisional Patent Application No. 62/481,052 filed on Apr. 3, 2017, titled "Mixed Reality Generation of Schematics" both of which are incorporated by reference herein in their entirety.

BACKGROUND

Virtual reality (VR) and augmented reality (AR) visualization systems are starting to enter the mainstream consumer electronics marketplace. AR Head-Mounted Display (HMD) devices are one promising use of such technology. These devices may include transparent display elements that enable a user to see virtual content transposed over the user's view of the real-world. Virtual content that appears to be superimposed over the user's real-world view is commonly referred to as AR content. Displayed AR objects are often referred to as "holographic" objects. VR and AR visualization systems can provide users with entertaining or useful, immersive three-dimensional (3D) virtual environments in which they can visually (and sometimes audibly) experience things they might not normally experience in real life.

SUMMARY

The techniques introduced here enable a display system, such as an HMD device, to generate and display to a user a holographic schematic diagram (or simply "schematic") matching a real-world structure. A peripheral tool is used to aid with the precision and speed of the generation of the holographic schematic. The peripheral tool is capable of multiple physical orientations to indicate a variety of input and is tracked by the HMD device using a set of fixed fiducial markers. Software (running on the HMD device) uses a mounted, calibrated camera on the HMD device to capture the state of the markers and runs a perspective and point (PnP) process to accurately localize the tool. Using the known physical geometry of the tool, individual points and directions on the physical tool are easily computed.

The HMD device can further be configured to generate and display a holographic structure that appears to be affixed or coupled to the real-world structure as if the holographic structure was a real-world structure. The type of holographic structure may be based upon the type of real-world structure detected by the HMD device either through user input or through image recognition algorithms.

Other aspects of the technique will be apparent from the accompanying figures and

DETAILED DESCRIPTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

These and other techniques are described further below. First, however, it is useful to describe an example of an environment and a device in which these techniques can be implemented.

Figure 1:
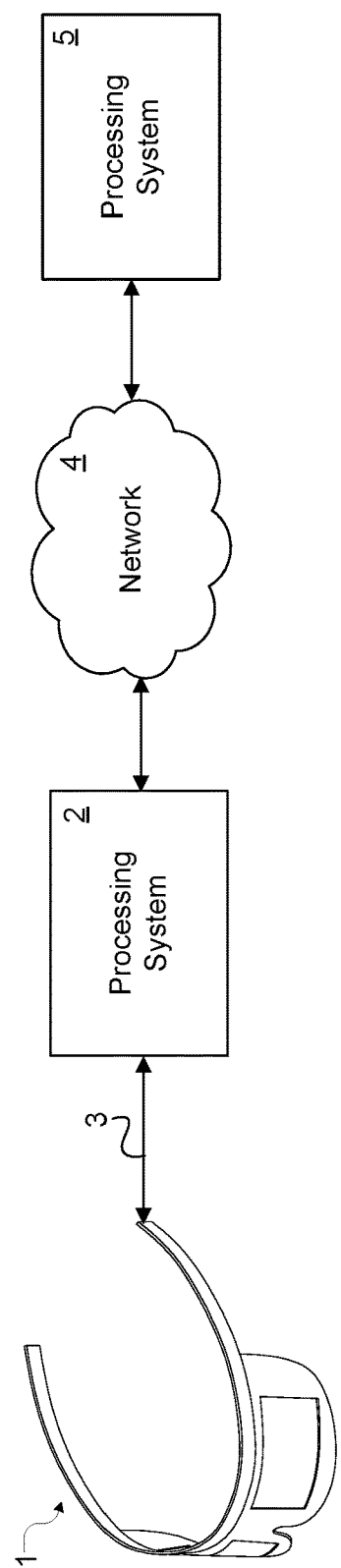
FIG. 1 illustrates an example of an environment including an HMD device.

FIG. 1 shows an example of an environment including an HMD device 1 that can implement the techniques introduced here. In the illustrated example, the HMD device 1 is configured to communicate data to and from an external processing device 2 through a connection 3, which can be a wired connection, a wireless connection, or a combination thereof. In other use cases, however, the HMD device 1 may operate as a standalone device. The connection 3 can be configured to carry any kind of data, such as image data (e.g., still images and/or full-motion video, including 2D and 3D images), audio data (including voice), multimedia, and/or any other type(s) of data. The processing device 2 may be, for example, a game console, personal computer, tablet computer, smartphone, or other type of processing device. The connection 3 can be, for example, a universal serial bus (USB) connection, Wi-Fi connection, Bluetooth or Bluetooth Low Energy (BLE) connection, Ethernet connection, cable connection, DSL connection, cellular connection (e.g., 3G, LTE/4G or 5G), or the like, or a combination thereof. Additionally, the processing device 2 may communicate with one or more other processing systems 5 via a network 4, which may be or include, for example, a local area network (LAN), a wide area network (WAN), an intranet, a metropolitan area network (MAN), the global Internet, or a combination thereof.

Figure 2:
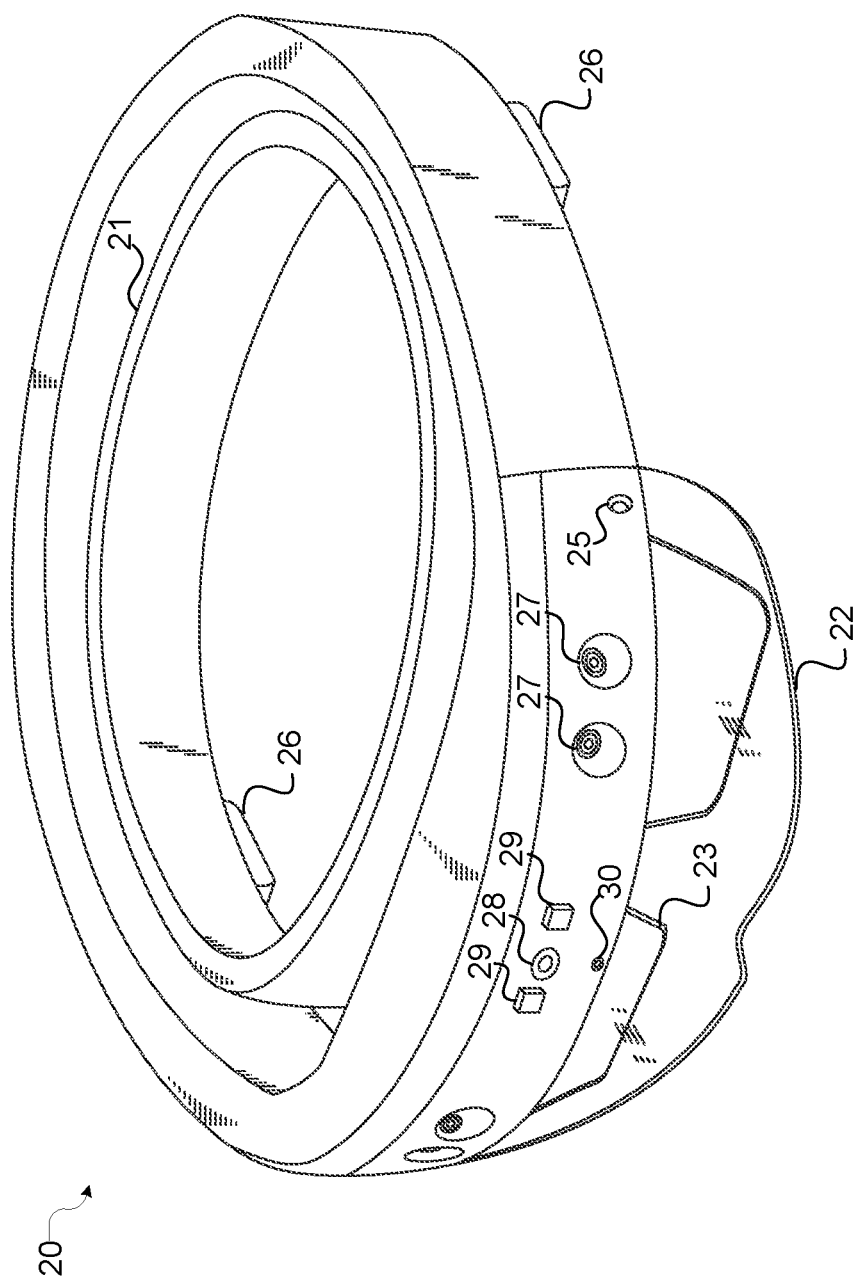
FIG. 2 shows a perspective view of an example of an HMD device.

FIG. 2 shows a perspective view of an example of an HMD device that can implement the techniques introduced here. The HMD device 20 can be an embodiment of HMD device 1 in FIG. 1. HMD device 20 includes a head fitting, namely, a headband 21, by which the HMD device 20 can be worn on the user's head. Attached to the headband 21 (directly or indirectly) is a transparent protective visor 22 that encloses one or more transparent AR display devices 23, each of which can overlay holographic images on the user's view of his real-world environment, for one or both eyes (e.g., by projecting light into the user's eyes). The protective visor 22 also encloses various circuitry (not shown) and sensors.

The HMD device 20 further includes one or more eye-tracking cameras 24, one or more microphones 25 to input speech from the user (e.g., for use in recognizing voice commands and providing audio effects); one or more audio speakers 26 to output sound to the user; one or more visible-spectrum tracking cameras 27 for use in capturing images of surrounding surfaces to allow tracking of the user's head position and orientation in real-world space and hand gesture recognition; one or more infrared (IR) spectrum depth cameras 28 for use in determining distances to nearby surfaces (e.g., for use in surface reconstruction to model the user's environment); one or more IR illumination sources 29 for use with the depth camera(s) 28; and one or more visible spectrum video cameras 30 for use in capturing standard video of what the user sees. The HMD device 20 also includes circuitry (not shown), which may be contained within the visor 22, to control at least some of the aforementioned elements and perform associated data processing functions (e.g., speech and gesture recognition and display generation). The circuitry may include, for example, one or more processors and one or more memories. Note that in other embodiments the aforementioned components may be located in different locations on the HMD device 20. Additionally, some embodiments may omit some of the aforementioned components and/or may include additional components not mentioned above.

An HMD device can be used for high efficiency capture and pre-visualization of measurements and projecting final manufacturing results. Schematic capture of a space typically involves two components—localization and labeling. This solution can improve on existing techniques in both these regards.

Figure 3:
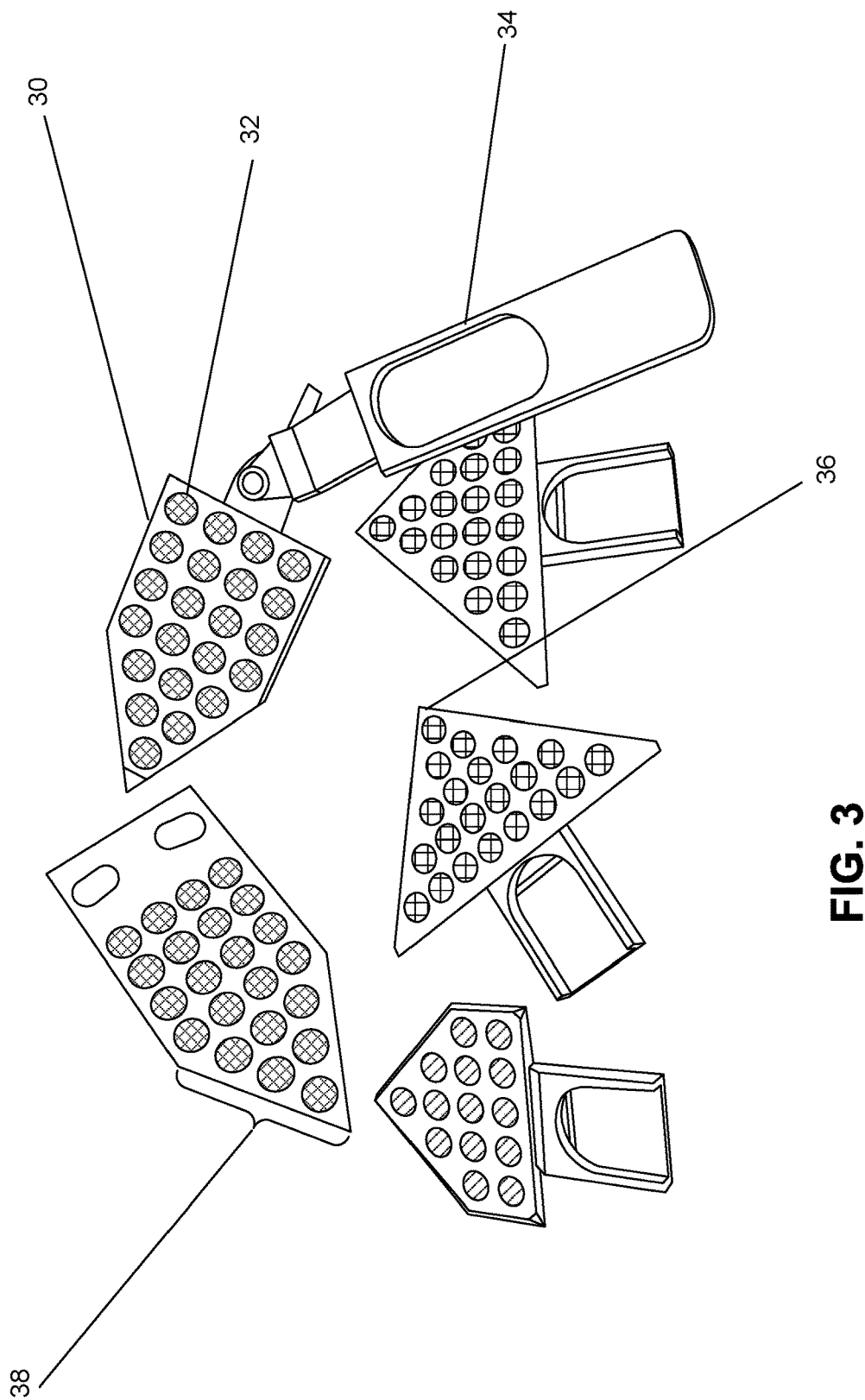
FIG. 3 illustrates a number of examples of peripheral devices that can be used in conjunction with an HMD device.

FIG. 3 illustrates a number of examples of peripheral devices, i.e., hand tools that can be used by a user of an HMD device. A peripheral tool 30 includes a number of fiducial markers 32. Each of the fiducial markers 32 is unique such that the HMD device 20 is able to identify the orientation of the peripheral tool 30 from recognition of relatively few of the fiducial markers 32 (e.g., 5). The size specifications of the peripheral tool 30 are included in the memory of the HMD device 20. The known size specifications enable precise identification of a given location or surface by recognition of some or all of the fiducial markers on the peripheral tool. The peripheral tool 30 may optionally include a handle 34 to for additional ease of positioning by a user.

The peripherals tool 30 each include a corner or point 36. The point 36 is used to identify particular location to generate a particular vertex in the digital space. When the point 36 is placed on a real-world location, the HMD device 20 includes programming to generate a digital vertex (i.e., a vertex of a holographic image) at that location. The peripheral tools 30 further include various edges 38. An edge 38 can be used to identify a particular plane or line. When a user positions the edge 38 against a real-world surface, the HMD device 20 is programmed to generate a digital plane or line of a holographic image relative to the position of the peripheral tool 30. The parameters of the plane or line are determined based on HMD device depth finding that identifies the real-world first deviation/variation from the line or plane as the bounds of the indicated line or plane.

In some embodiments, the point 36 and the edge 38 are used in conjunction where the point 36 indicates one bound of the line or plane. In some embodiments, rather than using the edge 38, the orientation of the surface including the fiducial markers 32 is used to determine the plane of surfaces defined by vertices indicated by the point 36.

The orientation of the peripheral tool 30 is aided by positional data of the HMD device 20. The HMD device 20 includes sensors in order to be "gravity-aware" to determine the down direction. Data indicative of the down direction further enables the HMD device 20 to determine the orientation of the peripheral tool 30.

Figure 4:
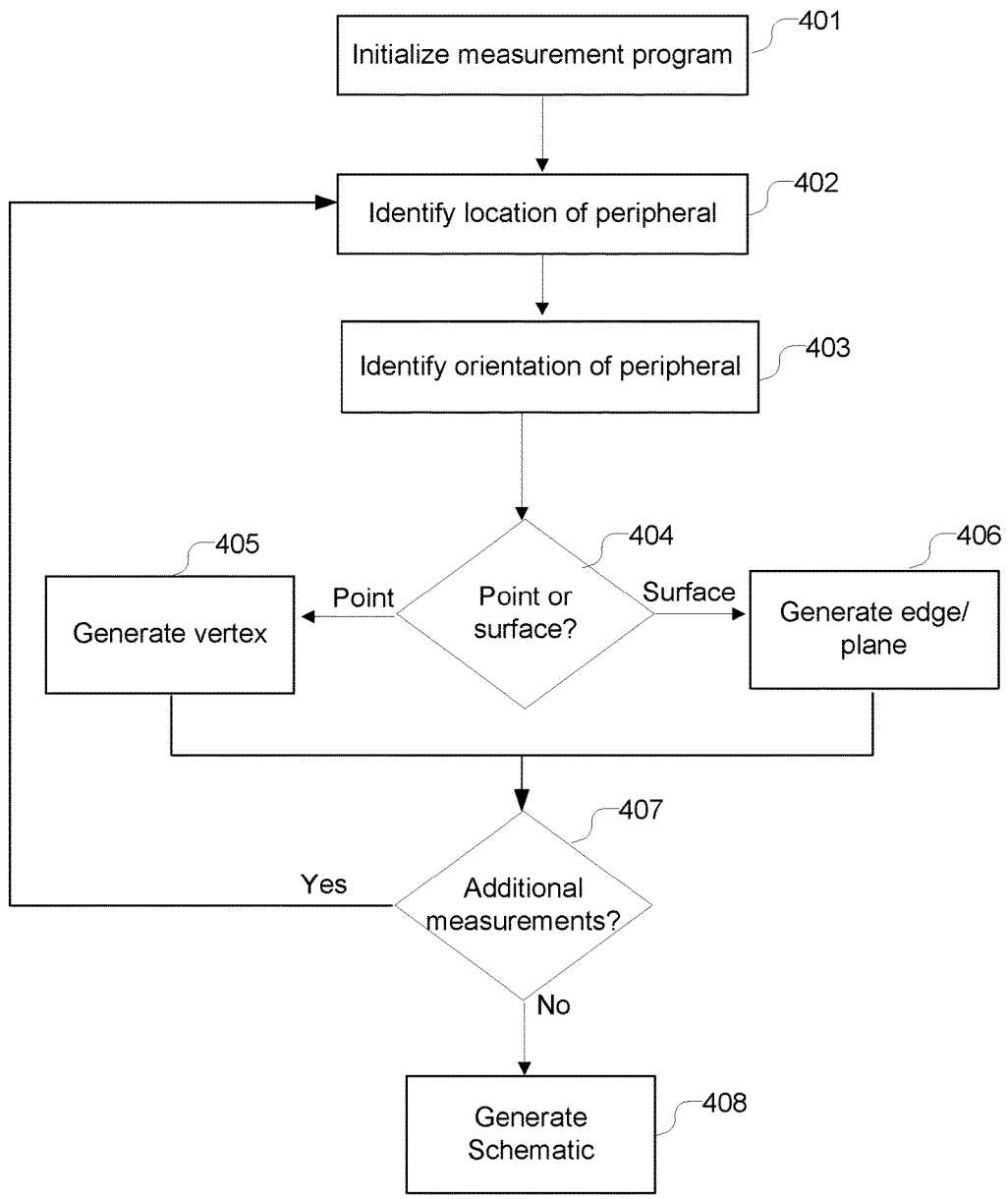
FIG. 4 is a flowchart illustrating the operation of a peripheral tool in combination with an HMD device.

FIG. 4 is a flowchart illustrating the operation of a peripheral tool in combination with an HMD device. In step 401, the HMD device initializes a measurement program. In this step, the HMD device checks orientation and scans local real-world surfaces. In step 402, The HMD device identifies a location of a peripheral tool. The HMD device uses recognition of fiducial markers to find the peripheral tool in the HMD device's field of view.

In step 403, the HMD device identifies the orientation of the peripheral tool. This is performed via identifying the comparative distance of each of the recognized fiducial markers. In step 404, the HMD device determines based on the orientation of the peripheral tool how to handle the user input of the peripheral tool location/positioning. The HMD device determines whether the user input is requesting a point or an edge/surface. To do this the HMD device interprets the orientation of the peripheral tool. In some embodiments, when only a point or corner of a peripheral tool contacts a surface, the HMD device handles the input as requesting a point/vertex. When an edge of the peripheral tool contacts a surface, the HMD device handles the input as requesting a line or edge. When the peripheral tool is laid flat on a surface, the HMD device interprets the input as requesting a plane. Where the user input indicates a point, in step 405, the HMD device generates a vertex in digital space. Where the user input indicates a plane or a line, in step 406, the HMD device generates a digital plane oriented with the peripheral tool, or a line parallel with the edge of the peripheral tool.

In step 407, the HMD device determines whether or not there are additional points to capture based on user input (e.g., voice command, button press, gesture, hiding the peripheral tool, or other known user input known in the art). Where there are additional inputs, the method returns to step 402. In step 408, where there are no additional surfaces or vertices, the HMD device generates a holographic schematic of the real-world structure as indicated/outlined by the peripheral tool.

Figure 5:
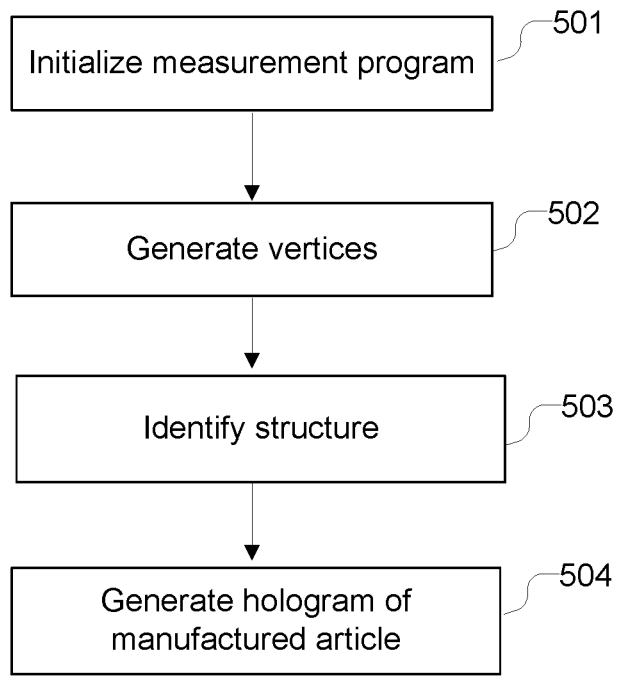
FIG. 5 is a flowchart illustrating the holographic generation of a manufactured device fitting a digital schematic.

FIG. 5 is a flowchart illustrating the generation of a holographic image of a manufactured (or to be manufactured) device corresponding to a digital schematic diagram ("schematic"). In step 501, the HMD device initializes a measurement program. In this step, the HMD device checks orientation and scans local real-world surfaces. This step proceeds similarly as step 401 in FIG. 4. In step 502, the HMD device generates a series of vertices for a holographic structure that matches a real-world structure. Each of the vertices is identified via user input.

In step 503, the HMD device identifies the holographic structure. This identification may be based on user input or based on automatic image recognitions algorithms. The recognition algorithms can use machine learning to compare shapes to expected models or parameters. Once the HMD device determines a type of structure through recognition algorithms, the user is enabled to reclassify the structure type via user input. In step 504, based on the determination of the character of the holographic structure the HMD device generates a holographic manufactured article to fit the holographic structure positioned digitally relative to the holographic structure. Examples of manufactured articles that can be positioned according to holographic structures include blinds in window frames, a treehouse in a tree, shelves/cabinets on a wall, a light fixture in a room, and a motorized chair in a stairwell.

Figure 6:
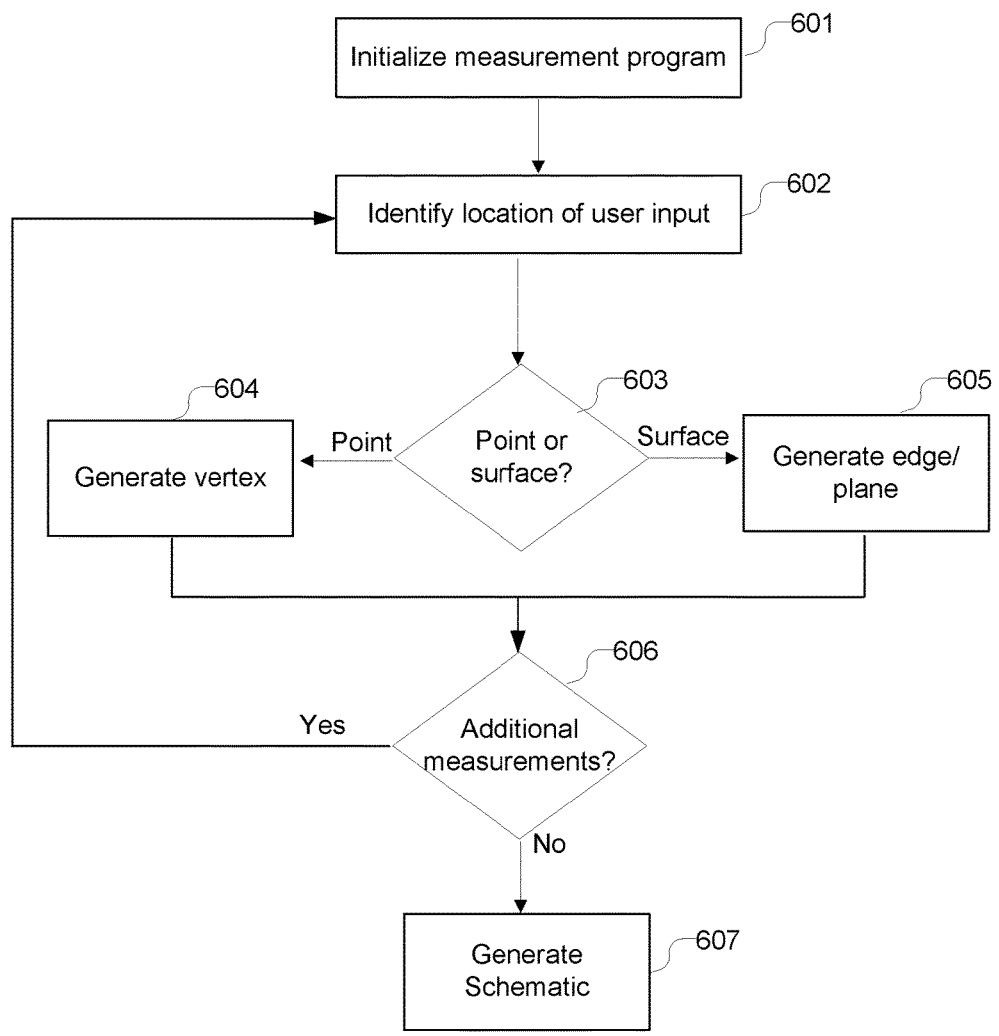
FIG. 6 is a flowchart illustrating the operation of an HMD device handling user input without a peripheral to measure real-world structures.

FIG. 6 is a flowchart illustrating the operation of an HMD device handling user input without a peripheral tool to measure real-world structures. The process of FIG. 6 flows similarly to that of FIG. 4. However, step 602 merely includes user input as opposed to the use of a peripheral tool. An example of suitable user input is pointing with a user's hand. Positioning of hands can substitute as peripheral tool orientation data. In some embodiments, voice commands supplement hand gestures to determine the manner in which the HMD device generates the holographic schematic (step 607). Examples of hand position input are the user tracing a location with their finger, and laying their hand flat on a surface and positioning a fingertip at a location.

In some embodiments, a user may merely identify a general vicinity, and the HMD device, using depth finding, generates a schematic of all real-world structures located within the general vicinity. While the HMD device is operational, it can use its depth camera(s) and associated processor(s) to construct a 3D mesh model of all surfaces in the user's vicinity (e.g., within several meters), or at least of all nearby surfaces within the user's field of view, including their distances from the user (i.e., from the HMD device). Techniques for generating a 3D mesh model of nearby surfaces by using depth detection (e.g., time of flight) are known in the art and need not be described herein.

In at least one such an embodiment, the user input is merely providing the HMD an image frame that includes the desired real-world structure. In some cases, the real-world structure covers more than a single image frame. In such cases, the user pans the HMD or moves thereby generating a number of consecutive image frames. For example, a user capturing a staircase may indicate a beginning frame to the HMD device, and then proceed to walk up the staircase while focusing on the stairs. While the user moves the HMD device captures a schematic of the staircase.

Figure 7:
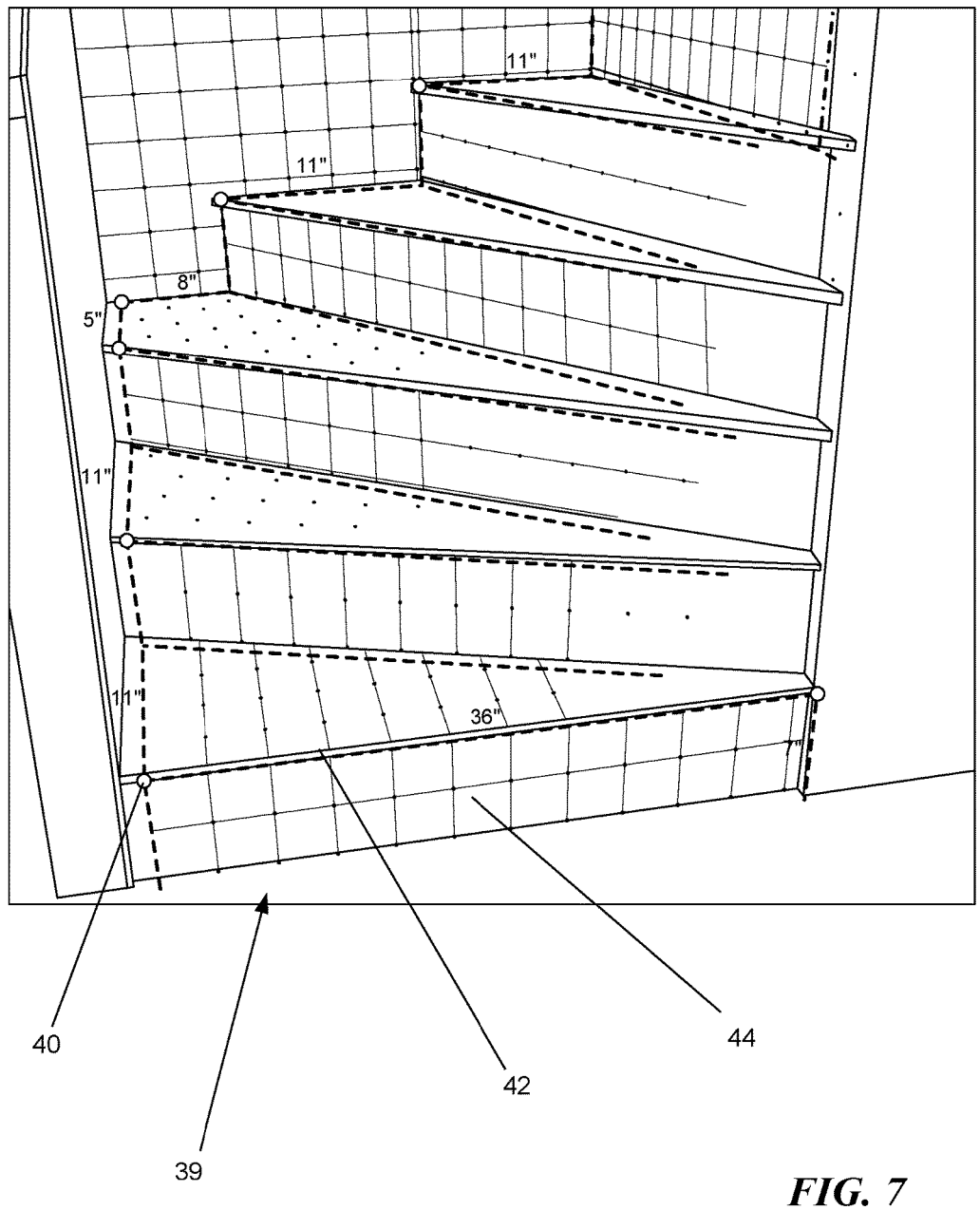
FIG. 7 is an image of a holographic schematic overlaid on a real-world structure.

FIG. 7 is an image of at least a portion of a holographic schematic 39 overlaid on a real-world structure. In this case, the real-world structure is a staircase. Overlaid on top of the staircase is a holographic schematic including a number of virtual vertices 40, virtual edges 42 connecting virtual vertices 40, and virtual surfaces 44 bounded by the virtual edges 42. Other examples of real-world structures that the HMD may generate holographic schematics of include a room, a natural structure such as a tree or a cave, a car, or other suitable physical structure that has visually ascertainable dimensions.

Figure 8:
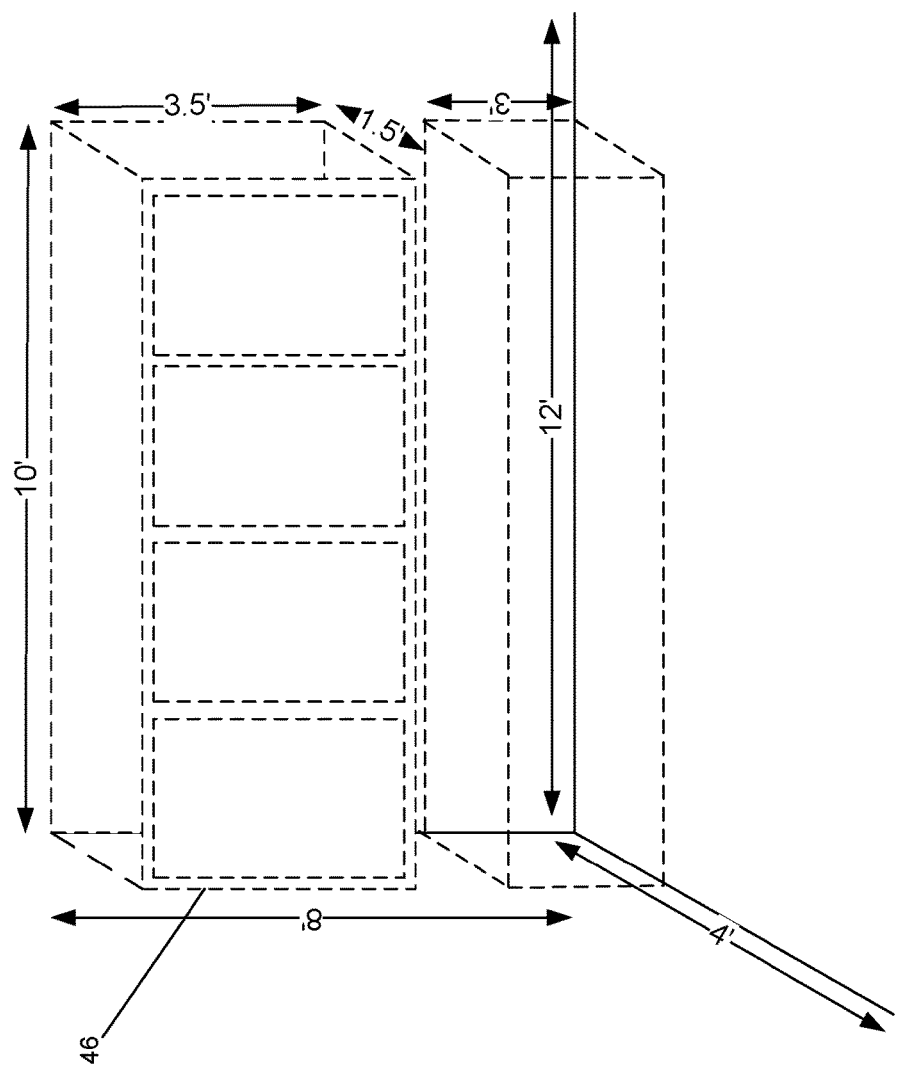
FIG. 8 is an image of a holographic structure generated based on a holographic schematic.

FIG. 8 is an image of a holographic structure 46 generated based on a holographic schematic. In this example, the holographic structure 46 is a set of cabinets positioned in the corner of a room. The HMD 20 device has generated a schematic of the room and has created a display of the virtual cabinets within that room. The HMD device 20 may generate the holographic structure 46 using specifications of corresponding real-world components. The HMD device 20 may also use a custom shape generated based on the particular character and shape of the holographic schematic 39. This enables a user to visualize the look of a manufactured article to install with the real-world structure.

In this example, the HMD device 20 has access to a virtual schematic of the corner of a room. The HMD device 20 or another source may have generated the schematic. The corner has twelve feet by four feet of floor space (this may not be the entire size of the room, but is the extent of the schematic). Further, the corner is eight feet tall. Thus, the HMD device 20 is able to determine that the corner will accommodate a ten feet by one and a half feet cabinet that is three and a half feet tall, and a counter having a similar footprint that is three feet tall. There is one and a half feet of remaining counter space. Thus, the HMD device 20 displays a holographic structure 46 (a cabinet) that matches this profile.

A number of real-world structures may be viewed with an HMD device in similar manner as described above, so as to appear to have holographic structures applied to them. For example, a real-world tree may include holographic insertion of a treehouse. A real-world car may include a holographic spoiler. A real-world house may include a holographic balcony.

Figure 9:
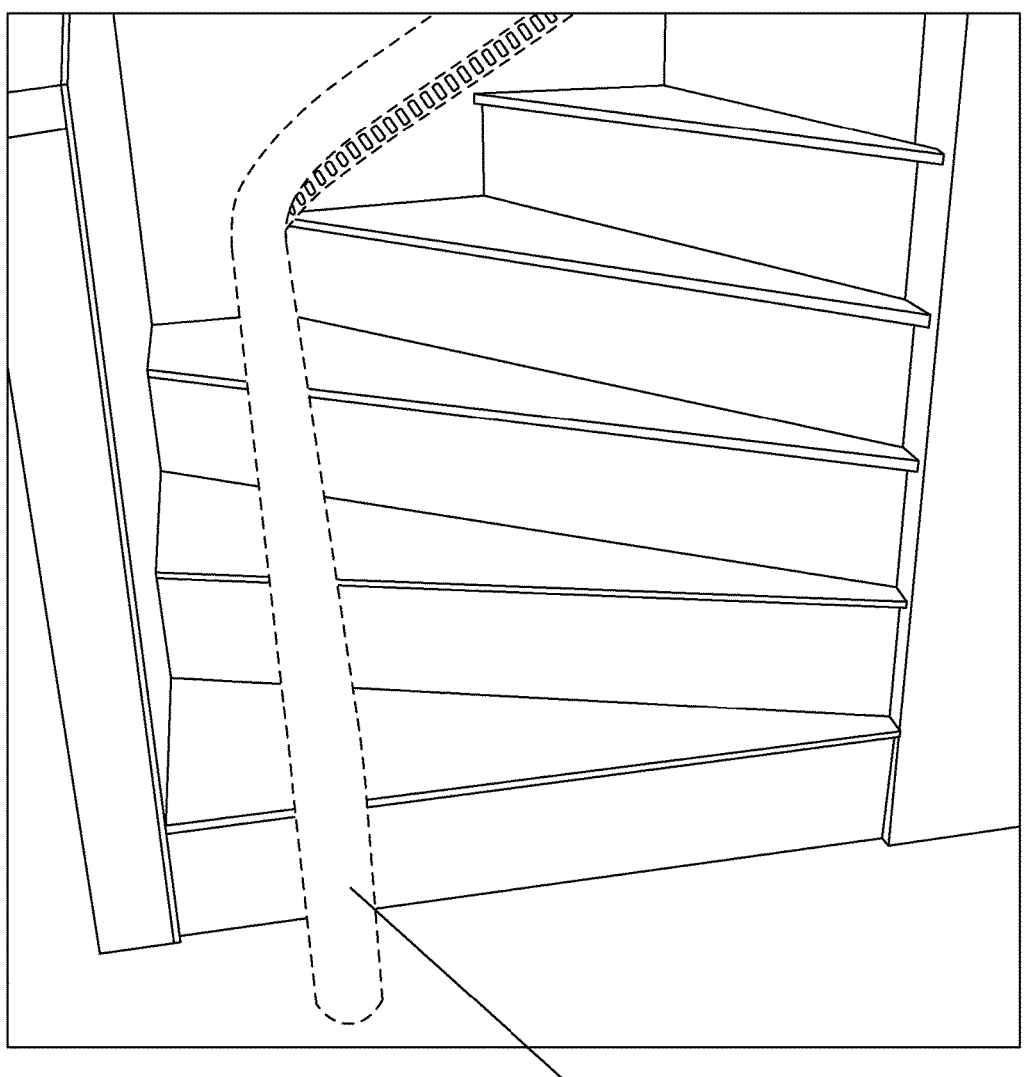
FIG. 9 is an image of an alternate holographic structure generated based on a holographic schematic.

FIG. 9 is an image of an alternate holographic structure generated based on a holographic schematic. In this example, the holographic structure 46 is a rail for an automated stairway chair. The holographic rail is displayed as applied to a real-world stairway. The holographic rail is generated by the HMD device 20 matching parameters of the captured schematic of FIG. 7.

Figure 10:
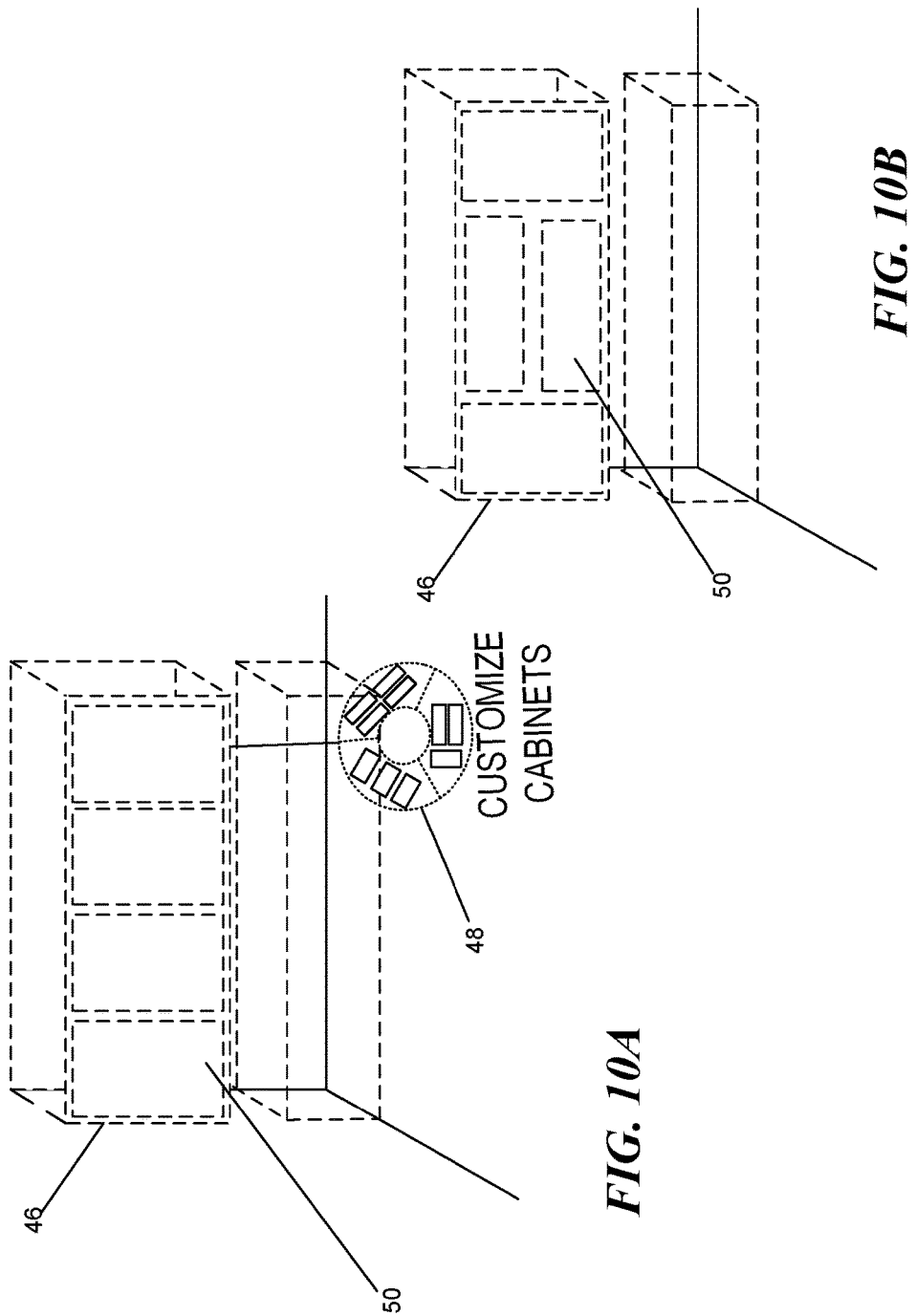
FIG. 10A is an image of a holographic user interface for selecting style options on a holographic structure where the holographic structure is in a first style configuration.
FIG. 10B is an image of a holographic in a second style configuration after receiving a selection in the holographic user interface.

FIG. 10A is an image of a holographic user interface for selecting style options on a holographic structure where the holographic structure is in a first style configuration. A holographic icon 48 includes user interface controls that enable a user to adjust the style or shape of the holographic structure 46 to preference. The figure displays a current holographic option 50 as chosen on the holographic user interface 48. In this case, the option is a series of vertical cabinets. In use, a user may tap a finger in the air near the location of the holographic user interface 48 to select alternate options within the user interface. Options include alternate styles, colors, materials appearance, and positioning of the holographic structure 46.

FIG. 10B is an image of a holographic in a second style configuration after receiving a selection in the holographic user interface. The figure displays a newly selected current holographic option 50 after the user engaged with the holographic icon 48. In this case, the option was of two vertical cabinets and two horizontal shelves.

By using the HMD device, and through the use of hand gestures, voice commands and/or controlled gaze, the user can create and manipulate various 3D holographic (AR) objects, such as spheres and cubes. For example, the user can create and delete holographic objects, move and rotate holographic structures 46, change colors, fill patterns, surface textures and decorations of holographic objects, etc. As shown, these objects are overlaid on the user's view of the real-world. Of course, many different variations of the above-described approaches are possible.

Figure 11:
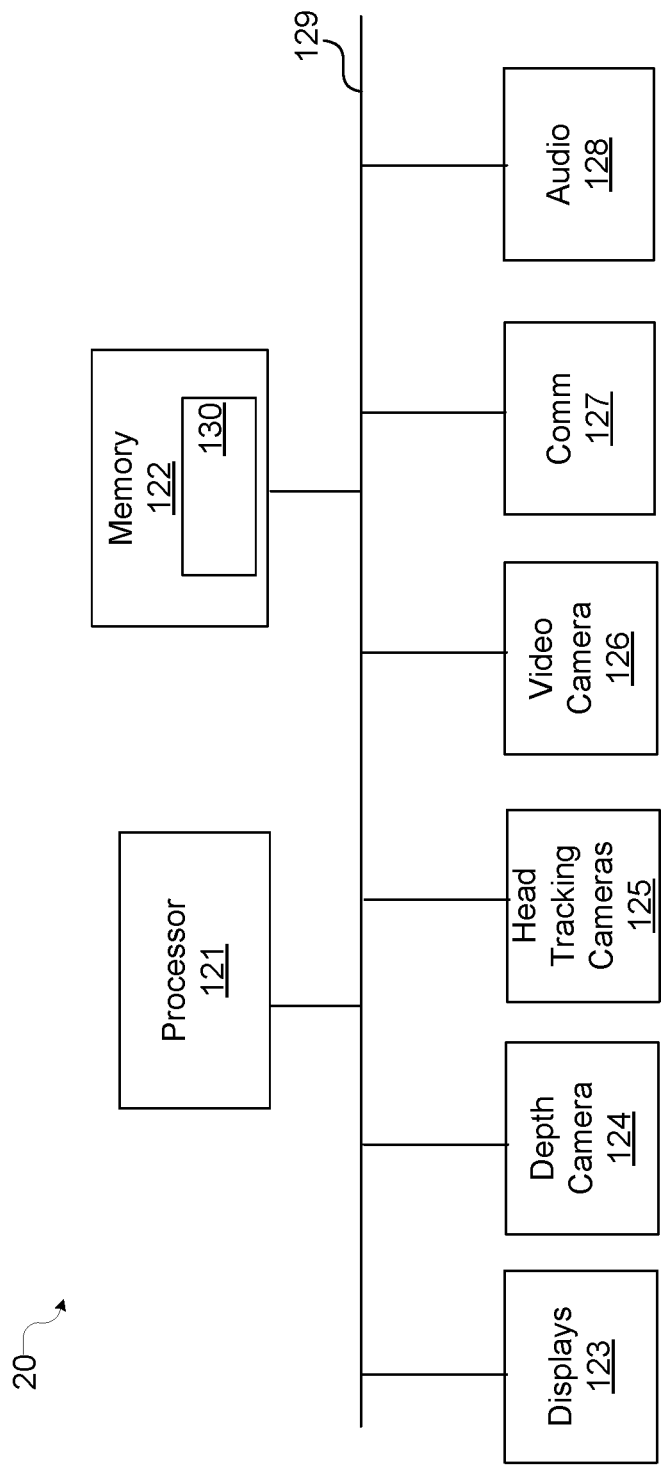
FIG. 11 is a block diagram showing an example of various functional components of an HMD device.

FIG. 11 shows an example of various functional components of the HMD device 20, according to some embodiments. In FIG. 11, the functional components of the HMD device 20 include one or more instance of each of the following: a main processor 121, memory 122, transparent display device 123, depth camera 124, head tracking cameras 125, video camera 126, communication device 127, and audio subsystem 128, all coupled together (directly or indirectly) by an interconnect 129. The interconnect 129 may be or include one or more conductive traces, buses, point-to-point connections, controllers, adapters, wireless links and/or other conventional connection devices and/or media, at least some of which may operate independently of each other.

The main processor(s) 121 individually and/or collectively control the overall operation of the HMD device 20 and perform various data processing functions. For example, the processor(s) 121 may provide or at least support the portable holographic user interface features described above. Each processor 121 can be or include, for example, one or more general-purpose programmable microprocessors, digital signal processors (DSPs), graphics processing unit (GPU), mobile application processors, microcontrollers, application specific integrated circuits (ASICs), programmable gate arrays (PGAs), or the like, or a combination of such devices.

Data and instructions (code) 130 that configure the processor(s) 121 to execute aspects of the technique introduced here can be stored in the one or more memories 122. Each memory 122 can be or include one or more physical storage devices, which may be in the form of random access memory (RAM), read-only memory (ROM) (which may be erasable and programmable), flash memory, miniature hard disk drive, conventional hard disk drive, or other suitable type of storage device, or a combination of such devices.

The depth camera(s) 124 can apply time-of-flight principles, for example, to determine distances to nearby objects. The distance information acquired by the depth camera 124 is used (e.g., by processor(s) 121) to construct a 3D mesh model of the surfaces in the user's environment. The head tracking camera(s) 125 enable the HMD device 20 to continuously track the current location and orientation of the user's head by acquiring images of the user's real-world environment. At least some of the functionality associated with surface detection and head tracking may be performed by the processor(s) 121.

The communication device(s) 127 enable the HMD device 20 to receive data and/or commands from, and send data and/or commands to an external processing system, such as a personal computer or game console, although in at least some embodiments the HMD device 20 can operate as a standalone device. Each communication device 127 can be or include, for example, a universal serial bus (USB) adapter, Wi-Fi transceiver, Bluetooth or Bluetooth Low Energy (BLE) transceiver, Ethernet adapter, cable modem, DSL modem, cellular transceiver (e.g., 3G, LTE/4G or 5G), baseband processor, or the like, or a combination thereof. The audio subsystem 128 includes at least one speaker and audio processing circuitry to output sound effects to the user.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software to implement the techniques introduced here may be stored on a non-transitory machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

EXAMPLES OF CERTAIN EMBODIMENTS

Certain embodiments of the technology introduced herein are summarized in the following numbered examples:

1. A method comprising: receiving user input at a head mounted display (HMD) device; in response to the user input, capturing, by the HMD device, a position and an orientation of a physical tool that has been positioned relative to a real-world structure for which a schematic diagram is to be created; and generating, by the HMD device, a first vertex for a virtual schematic diagram of the real-world structure based on the captured position and orientation of the tool, the virtual schematic diagram including a plurality of vertices positioned in virtual space, the plurality of vertices corresponding to points on the real-world structure.

2. The method of example 1, further comprising: capturing, by the HMD device, additional positions and orientations of the tool, in response to additional user inputs; generating, by the HMD device, the plurality of vertices based on the additional user inputs; and generating, by the HMD device, the virtual schematic diagram from the plurality of vertices.

3. The method of any of examples 1 to 2, wherein the virtual schematic diagram further comprises measurements of distances between neighboring vertices.

4. The method of any of examples 1 to 3, wherein said receiving user input further includes: capturing, by a camera on the HMD device, the position and the orientation of the tool in response to a perspective-n-point user input.

5. The method of any of examples 1 to 4, wherein the HMD device includes a profile of a physical geometry of the tool, said capturing step further comprising: computing the location and the orientation of the tool based on the profile.

6. The method of any of examples 1 to 5, wherein the HMD device includes stored data representing a profile of fiducial markers on the tool.

7. The method of any of examples 1 to 6, further comprising: identifying, by the HMD device based on the location and orientation of the peripheral tool, whether a corner of the peripheral tool, an edge of the peripheral tool, or a surface of the tool is within a specified proximity of the real-world structure; and wherein said generating includes determining, based on said identification, whether to generate a single vertex, a line, or a plane of the virtual schematic diagram.

8. The method of any of examples 1 to 7, further comprising: displaying, by the HMD device to a user of the HMD device, a 3D image of a second structure capable of being installed or constructed at the real-world structure, superimposed on the user's view of the real-world structure through the HMD device.

9. The method of any of examples 1 to 8, wherein said receiving user input further includes: receiving, by the HMD device, an audible command to capture the position and the orientation currently occupied by the tool.

10. The method of any of examples 1 to 9, wherein said generating the first vertex further comprises: basing the first vertex of the virtual schematic diagram on a first orientation of the tool, the first orientation being such that the tool is in contact with the real-world structure at only a pointed portion of the tool, the first vertex located at a corresponding first location in digital space indicated by the pointed portion of the tool.

11. The method of any of examples 1 to 10, wherein said generating the first vertex step further comprises: generating a line of the virtual schematic diagram bounded by the first vertex and a second vertex based on a first orientation of the tool, the first orientation being such that the tool is in contact with an edge portion of the tool with the real-world structure, the line generated at a first location corresponding to the edge portion of the tool and parallel to said edge portion, the first vertex and second vertex positioned at a second location and a third location respectively and determined by an environment mapping camera of the HMD device based upon recognized angular changes in the real-world structure.

12. The method of any of examples 1 to 11, further comprising: generating a plane of the virtual schematic bounded by a plurality of bounding vertices based on a first orientation of the tool, the first orientation being a flat surface portion of the tool laid on the real-world structure, the plane generated at a first location corresponding to the flat surface portion of the tool and corresponding locations of the plurality of bounding vertices determined by an environment mapping camera of the HMD device based upon recognized angular changes in the real-world structure.

13. A system comprising: a head mounted camera configured to receive user input including a tool and a real world structure; a processor configured to identify from the user input a plurality of positions and a corresponding plurality of orientations of the tool relative to the real-world structure to generate a plurality of vertices positioned in virtual space, vertices the vertices corresponding to points on the real-world structure; and a near-eye display configured to display a virtual schematic diagram of the real-world structure.

4 The system of example 13, further comprising: a memory configured to store a profile of a physical geometry and design of the tool, the profile used to compute the location and the orientation of the tool.

15. The system of any of examples 13 to 14, wherein the near-eye display is further configured to display to a user a 3D image of a second structure capable of being installed or constructed at the real-world structure, superimposed on the user's view of the real-world structure through the HMD device.

16. The system of any of examples 13 to 15, further comprising: a microphone coupled to the head mounted camera and configured to receive audible commands to capture the plurality of positions and the corresponding plurality of orientations occupied by the tool.

17. A method comprising: acquiring, by a head mounted display (HMD) device, a virtual schematic diagram of a first physical structure based on a user's use of a hand tool; and displaying, by the HMD device to a user of the HMD device, a 3D image of a second structure capable of being installed or constructed at the real-world structure, superimposed on the user's view of the real-world structure through the HMD device.

18. The method of example 17, further comprising: receiving, by the HMD device, user input interacting with the 3D image of the second structure; and displaying, by the HMD device to the user of the HMD device, an amended configuration of the 3D image of the second structure.

19. The method of any of examples 17 to 18, further comprising: displaying, by the HMD device to the user of the HMD device, a holographic user interface including a plurality of style options for the second structure; and receiving, by the HMD device, user input interacting with holographic user interface.

20. The method of any of examples 17 to 19, further comprising: storing a profile of a physical geometry of the hand tool on the HMD device; and characterizing the use of the hand tool based on the profile.

21 The method of any of examples 17 to 20, wherein the HMD device includes stored data representing a profile of fiducial markers printed on the hand tool.

22. The method of any of examples 17 to 21, further comprising: identifying, by the HMD device from a location and an orientation of the hand tool, whether a corner of the hand tool, an edge of the hand tool, or a surface of the hand tool is within a specified proximity of the real-world structure; and generating based on said identification, a single vertex, a line, or a plane of the virtual schematic diagram.

23. A method comprising: accessing, by a mixed reality display device, a virtual schematic diagram of a real-world structure; generating, by the mixed reality display device, image data representing a 3D image of a second structure capable of being installed or constructed at the real-world structure; and displaying, by the mixed reality display device to a user of the mixed reality display device, the 3D image of the second structure, based on the virtual schematic diagram, such that the 3D image of the second structure appears to the user as inserted into the user's view of the real-world structure while the user views the real-world structure through the mixed reality display device.

24. The method of example 23, further comprising: positions of vertices of the virtual schematic diagram are determined based on detecting, by the mixed reality device, positioning and orientation of a tool.

25. The method of any of examples 23 to 24, further comprising: positions of vertices of the virtual schematic diagram are determined based on detecting, by the mixed reality device, depth of surrounding space including the real-world structure.

26. The method of any of examples 23 to 25, further comprising: receiving, by the mixed reality display device, user input interacting with the 3D image of the second structure; and displaying, by the mixed reality display device to the user of the mixed reality display device, an amended configuration of the 3D image of the second structure.

27. The method of any of examples 23 to 26, further comprising: displaying, by the mixed reality display device to the user of the mixed reality display device, a holographic user interface including a plurality of style options for the second structure; and receiving, by the mixed reality display device, user input interacting with holographic user interface.

28. The method of any of examples 23 to 27, further comprising: capturing, by the mixed reality display device, the virtual schematic diagram of the real-world structure.

29. The method of any of examples 23 to 28, wherein said capturing further comprising: identifying, by the mixed reality display device, a position and an orientation of a hand tool for each of a plurality of vertices corresponding to the virtual schematic diagram.

30. The method of any of examples 23 to 29, wherein said capturing is performed by a depth camera on the mixed reality display device.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The invention claimed is:

1. A method comprising:
  receiving user input at a head mounted display (HMD) device;
  in response to the user input, capturing, by the HMD device, a position and an orientation of a physical tool that has been positioned relative to a real-world structure for which a schematic diagram is to be created;
  generating, by the HMD device, a first vertex for a virtual schematic diagram of the real-world structure based on the captured position and orientation of the tool, the virtual schematic diagram including a plurality of vertices positioned in virtual space, the plurality of vertices corresponding to points on the real-world structure; and
  wherein generating the first vertex further comprises generating a line of the virtual schematic diagram bounded by the first vertex and a second vertex based on a first orientation of the tool, the first orientation being such that an edge portion of the tool is in contact with the real-world structure, the line generated at a first location corresponding to the edge portion of the tool and parallel to the edge portion, the first vertex and the second vertex positioned at a second location and a third location respectively and determined by an environment mapping camera of the HMD device based upon recognized angular changes in the real-world structure.

2. The method of claim 1, further comprising:
  capturing, by the HMD device, additional positions and orientations of the tool, in response to additional user inputs;
  generating, by the HMD device, the plurality of vertices based on the additional user inputs; and
  generating, by the HMD device, the virtual schematic diagram from the plurality of vertices.

3. The method of claim 1, wherein the virtual schematic diagram further comprises measurements of distances between neighboring vertices.

4. The method of claim 1, wherein said receiving user input further includes:
  capturing, by, a camera on the HMD device, the position and the orientation of the tool in response to a perspective-n-point user input.

5. The method of claim 1, wherein the HMD device includes a profile of a physical geometry of the tool, said capturing further comprising:
  computing the location and the orientation of the tool based on the profile.

6. The method of claim 1, wherein the HMD device includes stored data representing a profile of a set of fixed fiducial markers on the tool, and further comprising identifying the position and the orientation of the tool by recognition of some or all of the set of fixed fiducial markers on the tool.

7. The method of claim 4, further comprising:
  identifying, by the HMD device based on the location and orientation of the tool, whether a corner of the tool, an edge of the tool, or a surface of the tool is within a specified proximity of the real-world structure; and
  wherein said generating includes determining, based on said identifying, whether to generate a single vertex, a line, or a plane of the virtual schematic diagram.

8. The method of claim 1, further comprising:
  displaying, by the HMD device to a user of the HMD device, a 3D image of a second structure capable of being installed or constructed at the real-world structure, superimposed on a view of the user of the real-world structure through the HMD device.

9. The method of claim 1, wherein said receiving user input further includes:
  receiving, by the HMD device, an audible command to capture the position and the orientation currently occupied by the tool.

10. The method of claim 1, wherein said generating the first vertex further comprises:
  basing the first vertex of the virtual schematic diagram on the first orientation of the tool, the first orientation being such that the tool is in contact with the real-world structure at a pointed portion of the tool, the first vertex located at a corresponding fourth location in digital space indicated by the pointed portion of the tool.

11. The method of claim 1, wherein the HMD device includes stored data representing a profile of a set of fixed fiducial markers on the tool and a physical geometry of the tool, and further comprising identifying the position and the orientation of the physical tool by recognition of some or all of the set of fixed fiducial markers on the tool and by recognition of at least a portion of the physical geometry of the tool.

12. A method, comprising:
  receiving user input at a head mounted display (HMD) device;
  in response to the user input, capturing, by the HMD device, a position and an orientation of a physical tool that has been positioned relative to a real-world structure for which a schematic diagram is to be created;
  generating, by the HMD device, a first vertex for a virtual schematic diagram of the real-world structure based on the captured position and orientation of the tool, the virtual schematic diagram including a plurality of vertices positioned in virtual space, the plurality of vertices corresponding to points on the real-world structure; and
  generating a plane of the virtual schematic bounded by a plurality of bounding vertices based on a first orientation of the tool, the first orientation being a flat surface portion of the tool laid on the real-world structure, the plane generated at a first location corresponding to the flat surface portion of the tool and corresponding locations of the plurality of bounding vertices determined by an environment mapping camera of the HMD device based upon recognized angular changes in the real-world structure.

13. The method of claim 12, further comprising:
  capturing, by the HMD device, additional positions and orientations of the tool, in response to additional user inputs;

generating, by the HMD device, the plurality of vertices based on the additional user inputs; and generating, by the HMD device, the virtual schematic diagram from the plurality of vertices.

14. The method of claim 12, wherein the virtual schematic diagram further comprises measurements of distances between neighboring vertices.

15. The method of claim 12, wherein the receiving user input further includes:

capturing, by a camera on the HMD device, the position and the orientation of the tool in response to a perspective-n-point user input.

16. The method of claim 12, wherein the HMD device includes a profile of a physical geometry of the tool, the capturing further comprising computing the location and the orientation of the tool based on the profile.

17. The method of claim 12, wherein the HMD device includes stored data representing a profile of a set of fixed fiducial markers on the tool, and further comprising identifying the position and the orientation of the tool by recognition of some or all of the set of fixed fiducial markers on the tool.

18. The method of claim 15, further comprising:

identifying, by the HMD device based on the location and orientation of the tool, whether a corner of the tool, an edge of the tool, or a surface of the tool is within a specified proximity of the real-world structure; and wherein the generating includes determining based on the identifying, whether to generate a single vertex or a line.

19. The method of claim 12, further comprising:

displaying, by the HMD device to a user of the HMD device, a 3D image of a second structure capable of being installed or constructed at the real-world structure, superimposed on a view of the user of the real-world structure through the HMD device.

20. The method of claim 12, wherein the receiving user input further includes:

receiving, by the HMD device, an audible command to capture the position and the orientation currently occupied by the tool.

21. The method of claim 12, wherein the generating the first vertex further comprises:

basing the first vertex of the virtual schematic diagram on a second orientation of the tool, the second orientation being such that the tool is in contact with the real-world structure at a pointed portion of the tool, the first vertex located at a corresponding second location in digital space indicated by the pointed portion of the tool.

* * * * *